(12) United States Patent
Staddon et al.

(10) Patent No.: US 9,317,807 B1
(45) Date of Patent: Apr. 19, 2016

(54) VARIOUS WAYS TO AUTOMATICALLY SELECT SHARING SETTINGS

(75) Inventors: Jessica Staddon, Redwood City, CA (US); Pavani Naishadh Diwanji, Los Gatos, CA (US); Jonathan S. McPhie, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 524 days.

(21) Appl. No.: 13/197,590

(22) Filed: Aug. 3, 2011

(51) Int. Cl.
  *G06N 5/02* (2006.01)
  *G06N 5/04* (2006.01)
  *G06N 99/00* (2010.01)

(52) U.S. Cl.
  CPC .............. *G06N 5/04* (2013.01); *G06N 99/005* (2013.01)

(58) Field of Classification Search
  CPC .................................................. G06N 99/00
  See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,697,478 B1 | 2/2004 | Meldrum et al. | |
| 6,754,322 B1 | 6/2004 | Bushnell | |
| 7,106,848 B1 | 9/2006 | Barlow et al. | |
| 7,366,990 B2 | 4/2008 | Pitroda | |
| 7,555,110 B2 | 6/2009 | Dolan et al. | |
| 7,610,287 B1 | 10/2009 | Dean et al. | |
| 7,742,468 B2 | 6/2010 | Vagelos | |
| 8,826,446 B1 * | 9/2014 | Liu ..................... | G06F 21/6245 726/1 |
| 2002/0137490 A1 | 9/2002 | Gallant | |
| 2002/0143874 A1 | 10/2002 | Marquette et al. | |
| 2003/0236708 A1 * | 12/2003 | Marsh ............................. | 705/26 |
| 2004/0258220 A1 | 12/2004 | Levine et al. | |
| 2005/0152521 A1 | 7/2005 | Liljestrand | |
| 2006/0026288 A1 | 2/2006 | Acharya et al. | |
| 2006/0077957 A1 | 4/2006 | Reddy et al. | |
| 2006/0206604 A1 | 9/2006 | O'Neil et al. | |

(Continued)

FOREIGN PATENT DOCUMENTS

WO   WO0279984   10/2002

OTHER PUBLICATIONS

Chandoo, "Become a Comparison Ninja—Compare 2 Lists in Excel and Highlight Matches", Jun. 17, 2010, http://chandoo.org/wp/2010/06/17/compare-2-lists-in-excel/, pp. 1-4.*

(Continued)

*Primary Examiner* — Stanley K Hill
*Assistant Examiner* — Paulinho E Smith
(74) *Attorney, Agent, or Firm* — Patent Law Works LLP

(57) ABSTRACT

A system and method for predicting one or more sharing settings for a social network user is provided. The relevant user data is received and analyzed. Based on the analysis of the relevant user data, one or more of the user's desired sharing settings is predicted. In some embodiments, statistical analysis is used to analyze and/or predict the user's desired sharing settings. One or more predictions including a suggested sharing setting are generated. In one embodiment, the user's sharing settings are automatically adjusted based on the one or more predictions. In one embodiment, the one or more predictions are sent for display to the user. In one embodiment, feedback is obtained from the user accepting or rejecting the predictions. In one embodiment, the feedback is used to adjust one or more of the algorithms for analyzing the user data, predicting the user's desired sharing settings, or both.

31 Claims, 9 Drawing Sheets

(56) References Cited

U.S. PATENT DOCUMENTS

| | | | |
|---|---|---|---|
| 2007/0127631 A1 | 6/2007 | Difiglia | |
| 2007/0171898 A1 | 7/2007 | Salva | |
| 2007/0173236 A1* | 7/2007 | Vishwanathan et al. | 455/414.1 |
| 2007/0248077 A1 | 10/2007 | Mahle, Jr. et al. | |
| 2008/0056475 A1 | 3/2008 | Brannick et al. | |
| 2008/0192656 A1 | 8/2008 | Vagelos | |
| 2008/0222088 A1* | 9/2008 | Horozov et al. | 707/2 |
| 2008/0270198 A1* | 10/2008 | Graves et al. | 705/7 |
| 2009/0144774 A1* | 6/2009 | Georgis et al. | 725/44 |
| 2009/0157450 A1* | 6/2009 | Athsani et al. | 705/7 |
| 2011/0098156 A1 | 4/2011 | Ng et al. | |
| 2011/0161476 A1* | 6/2011 | Wolff-Peterson | 709/222 |
| 2012/0096435 A1* | 4/2012 | Manolescu et al. | 717/121 |
| 2012/0116915 A1* | 5/2012 | Zheng | 705/26.7 |
| 2012/0131183 A1* | 5/2012 | Heidt et al. | 709/224 |
| 2012/0143718 A1* | 6/2012 | Graham et al. | 705/26.7 |
| 2012/0254246 A1* | 10/2012 | Kerger et al. | 707/780 |
| 2013/0132330 A1* | 5/2013 | Hurwitz et al. | 706/52 |

OTHER PUBLICATIONS

Adomavicius et al., "Towards the Next Generation of Recommender Systems: A Survey of the State-of-the-Art and Possible Extensions", 2005, IEEE, pp. 1-43.*

Stan Schroeder, "Facebook Privacy: 10 Settings Every User Needs to Know", Feb. 8, 2011, pp. 1-7. (URL: http://web.archive.org/web/20110208104422/http://mashable.com/2011/02/08/instagram-api/).*

Jones et al., "Contextual Dynamics of Group-Based Sharing Decisions", May 12, 2011, Proceedings of the SIGCHI Conference on Human Factors in Computing Systems, pp. 1777-1786.*

Banescu et al., "Do You Care About My Privacy?", Nov. 7, 2010, pp. 1-6.*

Lu et al., "Interactive Semisupervised Learning for Microarray Analysis", Jun. 2007, IEEE Transition on Computational Biology and Bioinformatics, vol. 4 No. 2, pp. 190-203.*

Ghazinour et al., "Monitoring and Recommending Privacy Settings in Social Networks", Mar. 22, 2013, EDBT/ICDT 2013, pp. 164-168.*

Munemasa et al., "Trend Analysis and Recommendation of Users' Privacy Settings on Social Networking Services", 2011, pp. 184-197.*

Shehab et al., "ROAuth: Recommendation Based Open Authorization", Jul. 22, 2011, Symposium on Usable Privacy and Security (SOUPS) 2011, pp. 1-12.*

Qingrui Li, "Semantics Enhanced Privacy Recommendation for Social Networking Sites", Feb. 2012, pp. 1-47.*

Banks et al., "Toward a Behavioral Approach to Privacy for Online Social Networks", 2010, LNCS 6430, pp. 19-34.*

Fang et al, "Privacy Wizards for Social Networking Sites", Apr. 30, 2010, WWW 2010, pp. 351-360.*

Adamic et al., "A Social Network Caught in the Web," Internet Journal, First Monday, Jun. 2, 2003, vol. 8, No. 6, pp. 1-22.

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, Oct. 23, 2005, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

O'Murchu et al., "Online Social and Business Networking Communities," Digital Enterprise Research Institute DERI Technical Report, National University of Ireland, Aug. 11, 2004, 22 pgs.

Ring Central, Inc., Internet, retrieved at http://www.ringcentral.com, Apr. 19, 2007, 1 pg.

Singh et al., "Cinema: Columbia InterNet Extensible Multimedia Architecture," Department of Computer Science, Columbia University, May 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

* cited by examiner

VARIOUS WAYS TO AUTOMATICALLY SELECT SHARING SETTINGS

The specification relates to social networks. In particular, the present specification relates to sharing settings on social networks. Still more particularly, the present specification relates to predicting one or more of a user's desired sharing settings based on an analysis of the user's relevant data.

BACKGROUND

Social networks are becoming an increasingly popular way for people to stay connected. This increasing popularity of social networks has given rise to social network services that have developed various ways users of the social network can communicate and share information. Users within a social network can send each other messages, view other users' activities, and share personal information, including personal photographs and videos. Social networking services can provide a forum for users to remain in close contact despite geographic distance or uncoordinated schedules. Further, the development of other online services that enable the general sharing of information has also increased. Users are typically able to adjust the amount and type of information they chose to share and how and with whom that information is shared. However, a user may neglect to alter the default sharing settings to settings that better match the user's desire for privacy or accessibility when creating a social network account or a user may neglect to adjust the sharing settings periodically as the user's needs and usage change.

SUMMARY OF THE INVENTION

The deficiencies and limitations of the prior art are overcome at least in part by providing a system and method for predicting one or more of a user's desired sharing settings based on an analysis of the user's relevant data.

An embodiment provides a computer-implemented method for predicting one or more sharing settings for a social network user. The relevant user data is received and analyzed. Based on the analysis of the relevant user data, one or more of the user's desired sharing settings is predicted. In some embodiments, statistical analysis is used to analyze the relevant user data and/or predict the user's desired sharing settings. One or more predictions including a suggested sharing setting are generated. In one embodiment, the user's sharing settings are automatically adjusted based on the one or more predictions. In one embodiment, the one or more predictions are sent for display to the user. In one embodiment, feedback is obtained from the user accepting or rejecting the predictions. In one embodiment, the feedback is used to adjust one or more of the algorithms for analyzing the user data, predicting the user's desired sharing settings, or both.

Another embodiment provides a system for predicting one or more sharing settings for a social network user. The system includes a processor, and at least one module, stored in the memory and executed by the processor. The module including instructions for receiving relevant user data; analyzing the relevant user data; predicting one or more of the user's desired sharing settings based on the analysis of the relevant user data; generating one or more predictions, wherein the prediction includes a suggestion of a desired sharing setting; and, depending on the embodiment, either sending the one or more predictions for display, or automatically adjusting the user's sharing settings according to the one or more predictions. In one embodiment, instructions for obtaining feedback when the user accepts or rejects the predictions are included. In one embodiment, instructions for using the feedback to adjust one or more of the algorithms for analyzing the user data, predicting the user's desired sharing settings, or both are included.

Yet another embodiment provides a graphical user interface for predicting one or more sharing settings for a user. The graphical user interface displays the one or more predictions, wherein the prediction includes a suggestion of at least one desired sharing setting. In one embodiment, the graphical user interface also displays the user's current sharing setting for each of the predictions. In one embodiment, the graphical user interface is displayed as a portion of a user's social network webpage. In another embodiment, the graphical user interface is displayed as a pop-up window.

BRIEF DESCRIPTION OF THE DRAWINGS

The embodiments are illustrated by way of example, and not by way of limitation in the figures of the accompanying drawings in which like reference numerals are used to refer to similar elements.

DETAILED DESCRIPTION

Figure 1:
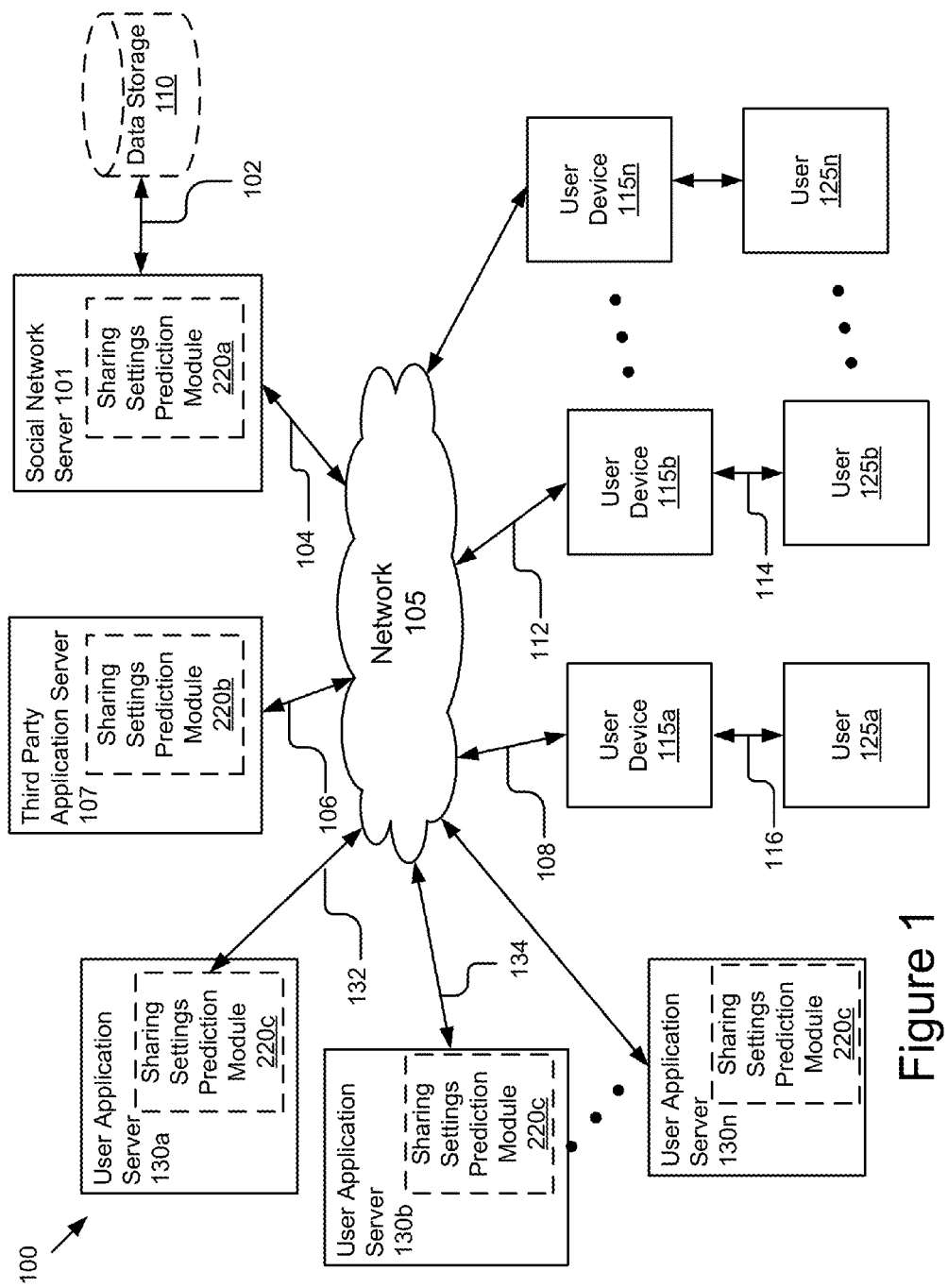
FIG. 1 illustrates a block diagram of a system for predicting one or more of a user's desired sharing settings based on an analysis of the user's relevant data according to one embodiment.

A system and method for predicting one or more of a user's desired sharing settings based on an analysis of the user's relevant data is described. In the following description, for purposes of explanation, numerous specific details are set forth in order to provide a thorough understanding. It will be apparent, however, to one skilled in the art that the embodiments can be practiced without these specific details. In other instances, structures and devices are shown in block diagram form in order to avoid obscuring the embodiments. For example, one embodiment is described below with reference to user interfaces and particular hardware. However, the embodiments apply to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, one embodiment can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be obtained from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present embodiments are not described with reference to any particular programming language. It will be appreciated that a variety of programming languages may be used to implement the teachings as described herein.

System Overview

FIG. 1 illustrates a block diagram of a social network system 100 for predicting one or more of a user's desired sharing settings based on an analysis of the user's relevant data according to one embodiment. In some embodiments, the sharing settings are the settings within a user's social network that controls who sees what information on that user's social network. For example, if a user sets his or her sharing settings to all the information being public, then everyone will be able to view that user's information. In some embodiments, users can set the sharing settings to allow certain users to view some information and allow other users to view other information on the user's social network.

The illustrated embodiment of the social network system 100 for predicting one or more of a user's desired sharing settings based on an analysis of the user's relevant data includes user devices 115*a*, 115*b*, 115*n* that are accessed by users 125*a*, 125*b*, 125*n*, a social network server 101 and a third party server 107. The system 100 also includes user application servers 130*a*, 130*b*. In the illustrated embodiment, these entities are communicatively coupled via a network 105. Although only three devices are illustrated, persons of ordinary skill in the art will recognize that any number of user devices 115*n* are available to any number of users 125*n*. Further, although only two user application servers 130*a*, 130*b* are illustrated, persons of ordinary skill in the art will recognize that any number of user application servers 130*n* are available.

The user devices 115*a*, 115*b*, 115*n* and user application servers 130*a*, 130*b* in FIG. 1 are used by way of example. While FIG. 1 illustrates two devices, the embodiment applies to any system architecture having one or more user devices and one or more user application servers. Furthermore, while only one network 105 is coupled to the user devices, 115*a*, 115*b*, 115*n*, the social network server 101 and the third party server 107, in practice any number of networks 105 can be connected to the entities. Furthermore, while only one third party application server 107 is shown, the system 100 could include one or more third party application servers 107.

The social network server 101 also contains a social network module 209. Although only one social network server 101 is shown, persons of ordinary skill in the art will recognize that multiple servers may be present. A social network is any type of social structure where the users are connected by a common feature. Examples include, but are not limited to, Orkut, Buzz, blogs, microblogs, and Internet forums. The common feature includes friendship, family, a common interest, etc. The common feature includes friendship, family, work, an interest, etc.

The network 105 enables communications between user devices 115a, 115b, 115n, and 115n, the social network server 101, the third party application 107 and user application servers 130a, 130b, and 130n. Thus, the network 105 can include links using technologies such as Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs) or Internet Protocol security (IPsec). In another embodiment, the entities can use custom and/or dedicated data communications technologies instead of, or in addition to, the ones described above. Depending upon the embodiment, the network 105 can also include links to other networks.

In one embodiment, the network 105 is a partially public or a wholly public network such as the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wireline or wireless (i.e., terrestrial- or satellite-based transceivers). In one embodiment, the network 105 is an IP-based wide or metropolitan area network.

In some embodiments, the network 105 helps to form a set of online relationships between users 125a, 125b, and 125n, such as provided by one or more social networking systems, such as social network system 100, including explicitly-defined relationships and relationships implied by social connections with other online users, where the relationships form a social graph. In some examples, the social graph can reflect a mapping of these users and how they are related.

In one embodiment, a sharing settings prediction module 220a is included in the social network server 101 is operable on the social network server 101. In another embodiment, the sharing settings prediction module 220b is included in the third party application server 107 and is operable on the third party application server 107. In another embodiment, the sharing settings prediction module 220c is included in the user application server 130a/130b/130n and is operable on the user application server 130a/130b/130n. Persons of ordinary skill in the art will recognize that the sharing settings prediction module 220 can be stored in any combination on the devices and servers. In some embodiments the sharing settings prediction module 220a/220b/220c includes multiple, distributed modules that cooperate with each other to perform the functions described below. Details describing the functionality and components of the sharing setting module 220a of the social network server are explained in further detail below with regard to FIG. 3.

In the illustrated embodiment, the user devices 115a, 115b, 115n are coupled to the network 105 via signal lines 108 and 112, respectively. The user 125a is communicatively coupled to the user device 115a via signal line 116. Similarly, the user device 115b is coupled to the network via signal line 112. The user 125b is communicatively coupled to the user device 115b via signal line 114. The third party application 107 is communicatively coupled to the network 105 via signal line 106. The social network server 101 is communicatively coupled to the network 105 via signal line 104. In one embodiment, the social network server 101 is communicatively coupled to data storage 110 via signal line 102. The user application servers 130a, 130b are coupled to the network 105 via signal lines 132, 134, respectively.

In one embodiment, data storage 110 stores data and information of users 125a/125n of the social network system 100. Such stored information includes user profiles and other information identifying the users 125a/125n of the social network system 100. Examples of information identifying users includes, but is not limited to, the user's name, contact information, sex, relationship status, likes, interests, links, education and employment history, location, political views, and religion. In one embodiment, the information stored in data storage 110 also includes the user's list of current and past contacts and the user's activities within the social network system 100, such as anything the user posts within the social network system 100 and any messages that the user sends to other users. In another embodiment, which is discussed below, a storage device 214 (see FIG. 2) is included in the social network server 101 and the storage device 214 stores the data and information of users 125a/125n of the social network system 100.

In one embodiment, the user device 115a, 115b, 115n is an electronic device having a web browser for interacting with the social network server 101 via the network 105 and is used by user 125a, 125b, 125n to access information in the social network system 100. The user device 115a, 115b, 115n can be, for example, a laptop computer, a desktop computer, a tablet computer, a mobile telephone, a personal digital assistant (PDA), a mobile email device, a portable game player, a portable music player, a portable music player, or any other electronic device capable of accessing a network.

In one embodiment, the user application servers 130a, 130b are servers that provides various services. Specifically, the user application servers 130a, 130b are servers that enable users of the social network system 100 to share information with other users of the social network system 100. For example, user applications servers 130a, 130b, 130n are servers that provide services such as the following: social networking; online blogging; organizing online calendars; creating, editing and sharing online calendars; sharing pictures; email services; creating and sharing websites; online chatting; sharing videos; and any other services that allow users to display and present information on the network 105. For example, in one embodiment, user application server 130a is a second social network server; user application server 130b is a third social network server; and user application server 130n is a fourth social network server. To illustrate in another example, according to another embodiment, the user applications server 130a is an email server; user applications server 130b is a photo sharing server; and user applications server 130n is a second social network server.

Social Network Server 101

Figure 2:
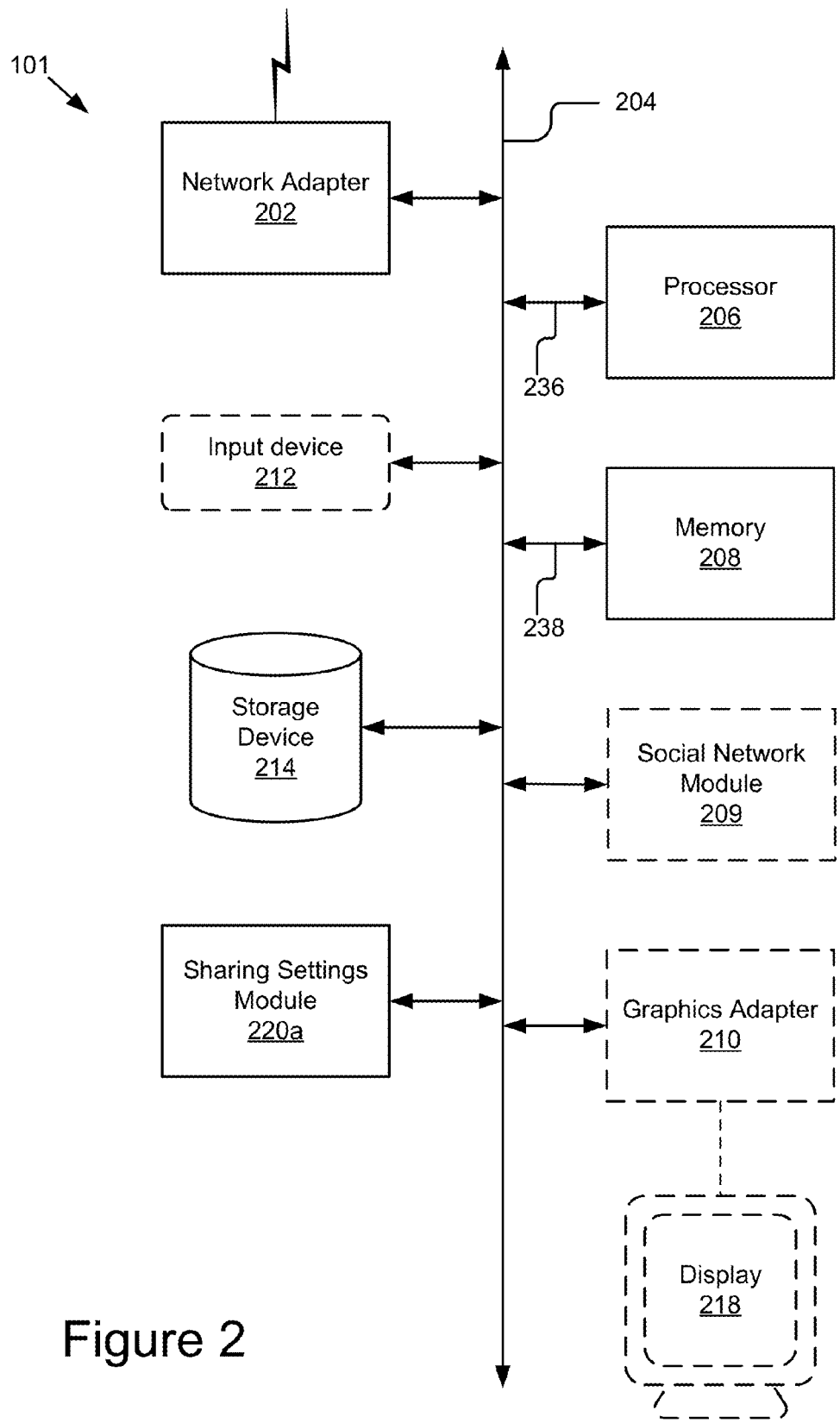
FIG. 2 is a block diagram of an embodiment of a social network server in accordance with one embodiment.

FIG. 2 is a block diagram of an embodiment of a social network server 101. As illustrated in FIG. 2, social network server 101 includes a network adapter 202 coupled to a bus 204. According to one embodiment, also coupled to the bus 204 are at least one processor 206, memory 208, a social network module 209, a graphics adapter 210, an input device 212, a storage device 214, and a sharing settings module 220a. In one embodiment, the functionality of the bus 204 is provided by an interconnecting chipset. The social network server 101 also includes a display 218, which is coupled to the graphics adapter 210.

The processor 206 may be any general-purpose processor. The processor 206 comprises an arithmetic logic unit, a microprocessor, a general purpose controller or some other processor array to perform computations, provide electronic display signals to display 218. The processor 206 is coupled to the bus 204 for communication with the other components of the social network server 101. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The social network server 101 also includes an operating system executable by the processor such as but not limited to WINDOWS®, MacOS X, Android, or UNIX® based operating systems.

The memory 208 stores instructions and/or data that may be executed by processor 206. The memory 208 is coupled to the bus 204 for communication with the other components via signal line 238. The instructions and/or data may comprise code for performing any and/or all of the techniques described herein. The memory 208 may be a dynamic random access memory (DRAM) device, a static random access memory (SRAM) device, flash memory or some other memory device known in the art. In one embodiment, the memory 208 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The social network module 209 is software and routines executable by the processor 206 to control the interaction between the social network system 101, storage device 214 and the user device 115a, 115b, 115n. An embodiment of the social network module 209 allows users 125a, 125b, 125n of user devices 115a, 115b, 115n to perform social functions between other users 125a, 125b, 125n of user devices 115a, 115b, 115n within the social network system 100.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 208 and comprises one or more devices including a hard disk drive, a floppy disk drive, a CD-ROM device, a DVD-ROM device, a DVD-RAM device, a DVD-RW device, a flash memory device, or some other mass storage device known in the art. In one embodiment, the storage device 214 is used to store user profiles and other information identifying users 125a/125n of the social network system 100. In some embodiments, such user data is stored in data storage 110.

The input device 212 may include a mouse, track ball, or other type of pointing device to input data into the social network server 101. The input device 212 may also include a keyboard, such as a QWERTY keyboard. The input device 212 may also include a microphone, a web camera or similar audio or video capture device. The graphics adapter 210 displays images and other information on the display 218. The display 218 is a conventional type such as a liquid crystal display (LCD) or any other similarly equipped display device, screen, or monitor. The display 318 represents any device equipped to display electronic images and data as described herein. The network adapter 202 couples the social network server 101 to a local or wide area network.

The sharing settings prediction module 220a is software and routines executable by the processor 206 to predict one or more of a user's desired sharing settings based on an analysis of the user's relevant data. An embodiment of the sharing settings prediction module 220a is software and routines executable by the processor 206 to predict one or more of a user's desired sharing settings based on an analysis of the user's relevant data. Details describing the functionality and components of the sharing settings prediction module 220a are explained in further detail below with regard to FIG. 3.

As is known in the art, a social network server 101 can have different and/or other components than those shown in FIG. 2. In addition, the social network server 101 can lack certain illustrated components. In one embodiment, a social network server 101 lacks an input device 212, graphics adapter 210, and/or display 218. Moreover, the storage device 214 can be local and/or remote from the social network server 101 (such as embodied within a storage area network (SAN)).

As is known in the art, the social network server 101 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 214, loaded into the memory 208, and executed by the processor 206.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Sharing Settings Prediction Module 220

Figure 3:
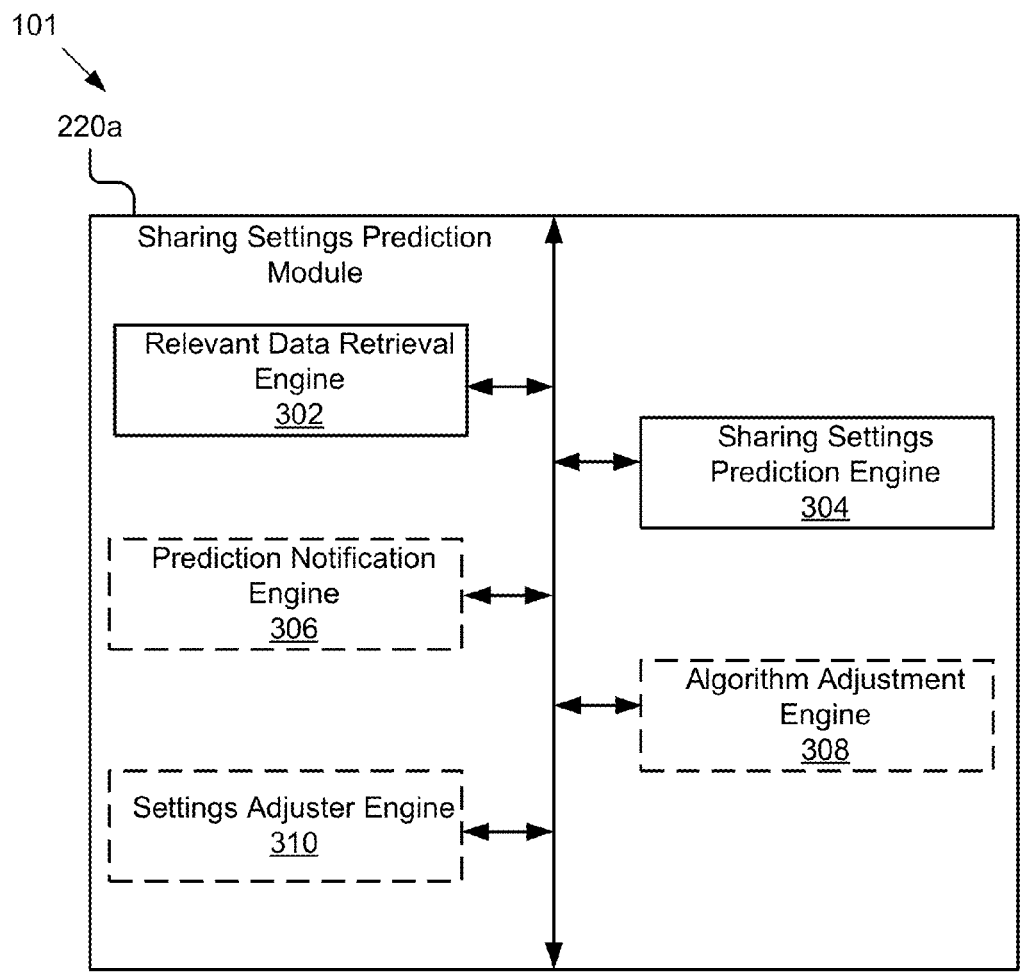
FIG. 3 is a block diagram illustrating a sharing settings prediction module according to one embodiment.

Referring now to FIG. 3, the sharing setting prediction module 220a is shown in more detail. In another embodiment, the third party application server 107 includes the sharing settings module 220b. In one embodiment, the sharing settings module 220a is software and routines executable by the processor 206 to predict one or more of a user's desired sharing settings based on an analysis of the user's relevant data.

In one embodiment, the sharing settings module 220a comprises a relevant data retrieval engine 302, and a sharing settings prediction engine 304, an optional prediction notification engine 306, an optional algorithm adjustment engine 308, and an optional settings adjuster engine 310.

The relevant data retrieval engine 302 is software and routines executable by the processor for receiving relevant data and sending the relevant data to the sharing settings prediction engine 304. Relevant data is data that is received by the relevant data retrieval engine 302 for analysis by the sharing settings prediction engine 304 discussed below. In one embodiment, the relevant data retrieval engine 302 is a set of instructions executable by a processor to provide the functionality described below for receiving relevant data. In another embodiment, the relevant data retrieval engine 302 is stored in memory of the social network server 101 and is accessible and executable by the processor. In either embodiment, the relevant data retrieval engine 302 is adapted for cooperation and communication with the processor and other components of the social network server 101.

According to one embodiment, the relevant data retrieval engine 302 is communicatively coupled to the storage device 214. The relevant data retrieval engine 302 is also communicatively coupled, via the sharing settings prediction module 220a of the social network server 101 to user application servers 130a, 130b, and 130n. In one embodiment, the relevant data retrieval engine 302 receives data from the user application servers 130a, 130b, and 130n. According to one embodiment, the relevant data retrieval engine 302 is communicatively coupled, via the sharing settings prediction module 220a of the social network server 101 to the data store 110. In one embodiment, the relevant data retrieval engine 302 receives data from the data store 110. In some embodiments, data is received from other applications, such as data stored in user application servers 130a/130b/130n. In some embodiments, the other applications are other social network servers. In such embodiments, examples of data received includes, but is not limited to, user sharing data including frequency of use of the application and the scope of communication within the applications or social network servers.

The sharing settings prediction engine 304 is software and routines executable by the processor for analyzing the received relevant data and predicting one or more of the user's desired sharing settings based an analysis of that relevant data. In one embodiment, the sharing settings prediction engine 304 is a set of instructions executable by a processor to provide the functionality described below for analyzing relevant data and predicting one or more of the user's desired sharing settings based on that relevant data. In another embodiment, the sharing settings prediction engine 304 is stored in the memory 208 of the social network server 101 and is accessible and executable by the processor 206. In either embodiment, the sharing settings prediction engine 304 is adapted for cooperation and communication with the processor and other components of the social network server 101.

In one embodiment, sharing settings are embodied in levels. Each level corresponds to various sharing settings for an attribute. According to one embodiment, an attribute is a type of information in an application associated with a user of the social network system 100. For example, an attribute may be a type of information in an application to be displayed to other within the social network system 100, such as the user's name. As another example, another feature is the user's profile picture. Another example of an attribute is the user's address. An attribute may also be sharing setting of a user of the social network system 100.

According to one embodiment, the sharing settings are divided into three levels which are low, medium, and high. A low level applies permissive sharing settings to the feature making all or most of the information contained in the feature available to all the users of the system 100. A medium level applies moderate sharing settings to the feature making the information contained in the feature available to direct connections of the user. A high level applies stringent sharing settings to the feature and makes the information contained in the feature available to only the user. The foregoing is an example of how sharing setting levels correlate with access to information associated with an attribute. Other embodiments can include different and or additional protection levels and different associated sharing settings. As described in this embodiment, three levels of sharing protection are shown. However, in other embodiments, there can be any number of sharing protection levels.

In one embodiment, the sharing settings prediction engine 304 utilizes one or more algorithms to analyze the relevant data. In one such embodiment, one or more algorithms are based on common sense assumptions about sharing settings preference in regards to one or more user characteristics. For example, if the user is a girl in her early teens whose photographs are frequently accessed by much older men that are not friends of the girl, in one embodiment, a common sense assumption is that such access is undesirable. In one such embodiment, the sharing settings prediction engine 304 predicts that the user desires a sharing setting other than a low-level setting for features associated with photograph sharing in order to prohibit such access.

In another such embodiment, one or more of the algorithms utilize aggregate statistics, which can demonstrate one or more themes in a population based on the presence of a certain characteristic or set of characteristics. For example, a fictional aggregate statistic is that 70% of married social network users over age 50 share their photographs only with their friends and family. In the example, the theme is photograph sharing; the population is social network users; and the set of characteristics is married and over 50 years of age. In the example, in one embodiment, if the sharing settings prediction engine 304 analyzed the user's data and found that the user was over 50 years of age and married the sharing settings prediction engine 304 predicts that the user desires medium-level sharing protection. In one embodiment, the aggregate statistics are generated at least in part by a statistical analysis of the users and user accounts of the social network system 100.

In yet another such embodiment, one or more algorithms used by the sharing settings prediction engine 304 analyze the relevant data using statistical weighting, which can emphasize, or diminish, the effect of a variable on the result of the algorithm. For example, in one embodiment, the sharing settings prediction engine 304 analyzes the user's sharing settings for other sites and applications, and the user's demographic. In this example, the user's sharing settings for all the other sites and applications are the default sharing setting for those sites and applications. In one embodiment, the usefulness of these default sharing settings in predicting one or more of the desired sharing settings is inconclusive. The default sharing settings may represent the settings the user actually desires or they may be the result of the user neglecting to personalize the sharing settings. In this example, in one embodiment, the algorithm used by the sharing settings prediction engine 304 gives less statistical weight to the user's sharing settings for other sites and applications because of their inconclusive usefulness for predicting one or more of the user's desired sharing settings. Therefore, more statistical weight is assigned to the user's demographics thereby predicting the user's desired sharing settings predominantly based on the user's demographic in accordance with one embodiment. In one embodiment, one or more of the algorithms can be modified by user feedback described below.

According to one embodiment, the sharing settings prediction engine 304 analyzes and predicts one or more of the user's desired sharing settings based on relevant data associated with the user's sharing settings on other websites and applications. In one such embodiment, the sharing settings prediction engine 304 analyzes the user's other sharing settings for the presence and the nature of consistencies then predicts one or more of the user's desired sharing settings based on that analysis. For example, in one embodiment, if the analysis reveals the user's other sites and applications exhibit predominantly high-level sharing settings, the sharing settings prediction engine 304 predicts that the user desires high-level settings on the social network 101.

According to one embodiment, the sharing settings prediction engine 304 analyzes the user's relevant data and predicts one or more of the user's desired sharing settings based on relevant data associated with the user's online usage. Online usage includes, but is not limited to, the posting, tagging, blogging, micro-blogging and other sharing by the user whether on the social network 100 or on another site or application. In one such embodiment, the sharing settings prediction engine 304 analyzes the user's online usage for frequency, content, and scope of the user's sharing. For example, in one embodiment, if analysis reveals the user regularly maintains a public blog under the user's actual name, the sharing settings prediction engine 304 predicts that the user desires low-level sharing settings, because there is high frequency, the blog contains the user's actual information (name), and the blog is publicly accessible.

According to one embodiment, the sharing settings prediction engine 304 analyzes and predicts one or more of the user's desired sharing settings based on relevant data associated with the sharing settings of one or more of the user's contacts on the social network. In one such embodiment, the sharing settings prediction engine 304 analyzes the sharing settings of one or more of the user's contacts for consistencies and the nature of those consistencies. For example, in one embodiment, if the user's contacts predominantly use high-level sharing settings, the sharing settings prediction engine 304 predicts that the user desires high-level sharing settings. In one embodiment, the sharing settings prediction engine 304 analyzes the user's close contact, or contacts.

According to one embodiment, the sharing settings prediction engine 304 analyzes and predicts one or more of the user's desired sharing settings based on relevant data regarding the user's demographic. In one embodiment, the user's demographic includes information about the user's age, which is submitted by the user. For example, in one embodiment, if aggregate statistics indicate that users in their late teens or early twenties prefer low-level sharing settings, the sharing settings prediction engine 304 predicts that a twenty year-old user desires low-level sharing settings. In another embodiment, the user's demographic information includes the user's gender, which is submitted by the user. For example, in one embodiment, if aggregate statistics indicate that male users prefer low-level sharing settings, the sharing settings prediction engine 304 predicts that a male user desires low-level sharing settings. In another embodiment, the user's demographic information includes the user's education, which is submitted by the user. For example, in one embodiment, if aggregate statistics indicate that users with post graduate degrees desire high-level sharing settings, the sharing settings prediction engine 304 predicts that a user with a post grad degree desires high-level sharing settings. In another embodiment, the user's demographic information includes the user's profession, which is submitted by the user. For example, in one embodiment, if aggregate statistics indicate that users in the hospitality industry desire medium-level sharing settings, the sharing settings prediction engine 304 predicts that a user who works as a tour guide desires medium-level sharing settings. In another embodiment, the user's demographic information includes the user's relationship status, which is submitted by the user. For example, in one embodiment, if aggregate statistics indicate that married users desire medium-level sharing settings, the sharing settings prediction engine 304 predicts that a married user desires medium-level sharing settings. In another embodiment, the user's demographic information includes the user's geographic location. For example, in one embodiment, if aggregate statistics indicate that users in New England desire low-level sharing settings, the sharing settings prediction engine 304 predicts that a user in Massachusetts desires low-level sharing settings.

According to one embodiment, the sharing settings prediction engine 304 analyzes and predicts one or more of the user's desired sharing settings based on relevant data regarding the user's characteristics. In one embodiment, the user's characteristics data is the results of a quiz or questionnaire the user answers. For example, in one embodiment, if common sense indicates that users identified by a quiz as extraverted does not desire high-level sharing settings, the sharing settings prediction engine 304 predicts that a user who takes the quiz and is identified as extraverted desires sharing settings other than high-level. In another embodiment, the characteristics data is the results of a puzzle or game the user played, which provides insight into the user's characteristics. For example, a person who plays Sudoku may be introverted and perhaps prefer higher-level sharing settings. It should be noted that personality traits are just one of many user characteristics that can be inferred. For example, in one embodiment, the user's acceptance of technology may be inferred. If a user discloses on a quiz, for example, that the user has many online accounts and spends many hours a day online or on a social network site, it may be inferred that the user is comfortable with sharing information online and prefers lower-level sharing settings. In another embodiment, characteristics data is associated with the user's e-mail and calendar and the user's interaction preferences are inferred. For example, in one embodiment, a user who corresponds by e-mail frequently, but does not have many meetings or face-to-face appointments in his or her calendar the sharing settings prediction engine 304 predicts that the user desires low-level sharing settings, since the user's preferred method of interaction is electronic.

According to one embodiment, the sharing settings prediction engine 304 analyzes and predicts one or more of the user's desired sharing settings based on relevant data regarding other users or applications accessing the user's features. For example, in one embodiment, if it is a common sense assumption that users whose features are frequently accessed by applications other than the applications the users use desire medium-level sharing settings which prohibits such use, the sharing settings prediction engine 304 predicts that the user desires medium-level sharing settings.

In one embodiment, the sharing settings prediction engine 304 predicts one or more of the user's desired sharing settings by selection. For example, in one such embodiment, the sharing settings prediction engine 304 predicts that a married, sixty-year-old lawyer desires high-level sharing protection. In another embodiment, the sharing settings prediction engine 304 predicts one or more of the user's desired sharing settings by elimination. For example, in one such embodiment, the sharing settings prediction engine 304 predicts that a married, sixty-year-old lawyer does not desire low-level sharing protection.

According to one embodiment, the sharing settings prediction engine 304 predicts the user's desired sharing setting for each individual feature. For example, in one embodiment, the sharing settings prediction engine 304 analyzes the user's relevant data and predicts that the user desires a low-level sharing setting for the user's profile picture, a medium-level sharing setting for the user's posts, a high-level sharing setting for the user's address, a low-level sharing setting for the user's e-mail address, and a high-level sharing setting for the user's photographs. In another embodiment, the sharing settings prediction engine 304 predicts the user's desired sharing setting based on groups of features. For example, in one embodiment, the sharing settings prediction engine 304 analyzes the same user's relevant data and predicts, perhaps utilizing statistical weighting, that the user desires medium-level sharing settings for features associated with biographical information or posts and high-level sharing settings for features associated with photographs. In another embodiment, a plurality of user categories is defined based on user characteristics. Each user category is associated with the sharing settings predicted to be desired by a user fitting that user category. In one such embodiment, the sharing settings prediction engine 304 analyzes the user's relevant data and categorizes the user, which predicts the user's desired sharing settings are those associated with that user category.

Some embodiments of the sharing settings prediction module 220 also include a prediction notification engine 306. The prediction notification engine 306 is software and routines executable by the processor for notifying the user of the sharing settings prediction engine's 304 one or more predicted sharing settings. In one embodiment, the prediction notification engine 306 is a set of instructions executable by a processor to provide the functionality described below for notifying the user of the sharing settings prediction engine's 304 one or more predicted sharing settings. In another embodiment, the prediction notification engine 306 is stored in memory of the social network server 101 and is accessible and executable by the processor. In either embodiment, the prediction notification engine 306 is adapted for cooperation and communication with the processor and other components of the social network server 101.

The prediction notification engine 306 receives the predicted sharing settings from the sharing settings prediction engine 304, generates a prediction including a suggestion for a desired sharing setting, and sends the prediction for display to the user. In one embodiment, the prediction is displayed as a pop-up. In another embodiment, the prediction is an e-mail or message to the user. In one embodiment, the prediction is displayed on the page where sharing settings are normally set or displayed. In yet another embodiment, the prediction is another webpage. Other embodiments may use other forms of display.

In one embodiment, the prediction notification engine 306 compares the user's predicted sharing settings to the user's current sharing settings. In one embodiment, the prediction notification engine 306 generates a prediction only if one or more of the user's current sharing settings differ from the sharing setting predicted by the sharing settings prediction engine 304. In one embodiment, the prediction notifies the user specifically which feature, or features, have sharing settings different from those predicted by the sharing settings prediction engine 304. In one embodiment, the prediction includes the one or more sharing settings predicted by the sharing settings prediction engine 304 as suggestions for desired sharing settings. In one such embodiment, the prediction includes suggestions for desired sharing settings only for the sharing settings where the user's current setting differs from the predicted setting. In one embodiment, the prediction notification engine 306 notifies the user why, or based on what relevant data, one or more of the predicted sharing settings is based on. For example, in one embodiment, the notification could read "It is recommended that you change the sharing settings for your biographical information from low to medium due to repeated access by third-party applications."

Some embodiments of the sharing settings prediction module 220 also include an algorithm adjustment engine 308. The algorithm adjustment engine 308 is software and routines executable by the processor for changing one or more of the algorithms used by the sharing settings prediction engine 304 based on user feedback. In one embodiment, the algorithm adjustment engine 308 is a set of instructions executable by a processor to provide the functionality described below for changing one or more of the algorithms used by the sharing settings prediction engine 304 based on user feedback. In another embodiment, the algorithm adjustment engine 308 is stored in memory of the social network server 101 and is accessible and executable by the processor. In either embodiment, the algorithm adjustment engine 308 is adapted for cooperation and communication with the processor and other components of the social network server 101.

In one embodiment, user feedback is obtained when the user rejects one or more of the predicted sharing settings by either declining to accept the predicted sharing setting, or changing the sharing setting from the predicted sharing setting. In one embodiment, the rejection of one or more predicted sharing settings is feedback in and of itself. In one embodiment, the feedback is the user's response, or responses, to one or more questions submitted to the user regarding the reason, or reasons, the user prefers a non-predicted sharing setting. In one embodiment, the user's feedback adjusts one or more aggregate statistics used in one or more algorithms. In one embodiment, the user's feedback adjusts one or more statistical weighting factors used in one or more algorithms.

The settings adjuster engine 310 is software and routines executable by the processor for adjusting the user's sharing settings to the settings predicted by the sharing settings prediction engine 304. In one embodiment, the settings adjuster engine 310 is a set of instructions executable by a processor to provide the functionality described below for adjusting the user's sharing settings to the settings predicted by the sharing settings prediction engine 304. In another embodiment, the settings adjuster engine 310 is stored in memory of the social network server 101 and is accessible and executable by the processor. In either embodiment, the settings adjuster engine 310 is adapted for cooperation and communication with the processor and other components of the social network server 101.

In one embodiment, the settings adjuster engine 310 receives the predicted sharing settings from the sharing settings prediction engine 304 and adjusts the user's sharing settings to the predicted sharing settings. In another embodiment, the settings adjuster engine 310 receives the predicted sharing settings from the prediction notification engine 306 and adjusts the user's sharing settings to the predicted sharing settings. In one embodiment, for any adjustments to occur the user must accept one or more of the predicted sharing settings and only the sharing settings for the accepted predicted sharing settings are adjusted. In another embodiment, the user's sharing settings are automatically adjusted to the predicted sharing settings without user action or approval. In one embodiment, the user's sharing settings are only automatically adjusted to the predicted sharing settings without user action, or approval, if the predicted sharing setting is more stringent than the user's current sharing setting.

Figure 8:
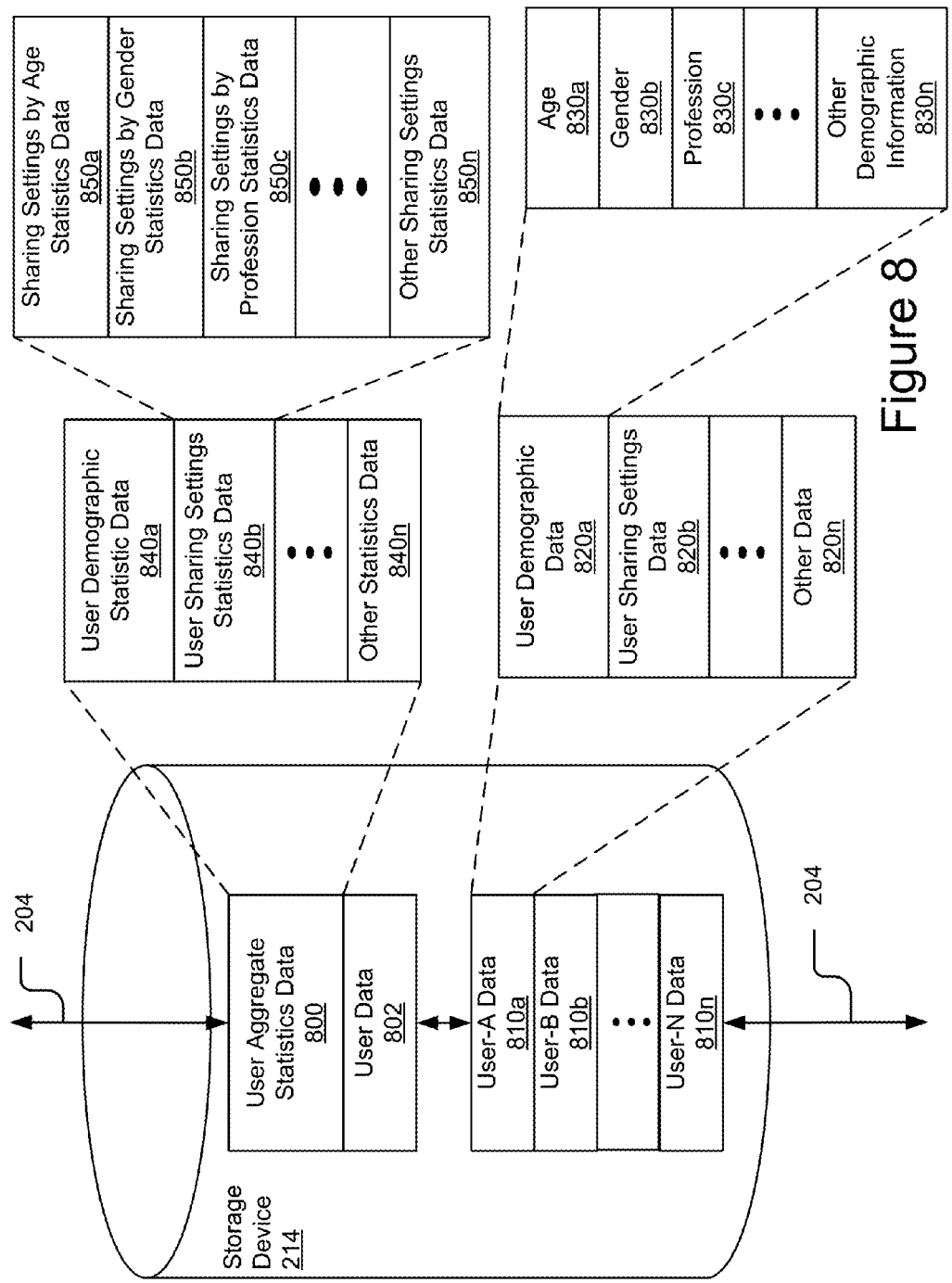
FIG. 8 illustrates a storage device storing user data including relevant data regarding the user's demographic and aggregate statistics data according to one embodiment.

FIG. 8 illustrates an example of a storage device 214 storing user aggregate statistics 800 data and user data 802 including data belonging to User-A 810a according to one embodiment. In this example, the User-A data 810a includes data regarding User-A's demographic 820a and User-A's sharing settings 820b. In one embodiment, User-A's demographic data 820a includes user submitted information regarding User-A's age 830a, gender 830b, profession 830c, and other demographic information 830n. The user aggregate statistics data 800 includes statistics data regarding the users of the social network system 100 including user demographic statistics 840a, user sharing settings statistics 840b, and other statistics data 840n according to one embodiment. In this example, the sharing settings statistics data 840b contains statistical data regarding user sharing settings by age 850a, gender 850b, profession 850c, and other sharing settings statistics. In one embodiment, the sharing settings prediction engine 304 analyzes the User A's demographic data 820a and predicts User A's desired sharing settings using algorithms involving aggregate statistics data for users sharing settings 840b.

In some implementations, the user may opt in/out of participating in such data collection activities. Furthermore, the collected data can be anonymized prior to performing the analysis to obtain the various statistical patterns described above.

As mentioned above, in one embodiment, the sharing settings prediction module 220c is included in the user application server 130a/130b/130n and is operable on the user application server 130a/130b/130n.

Method

Figure 4:
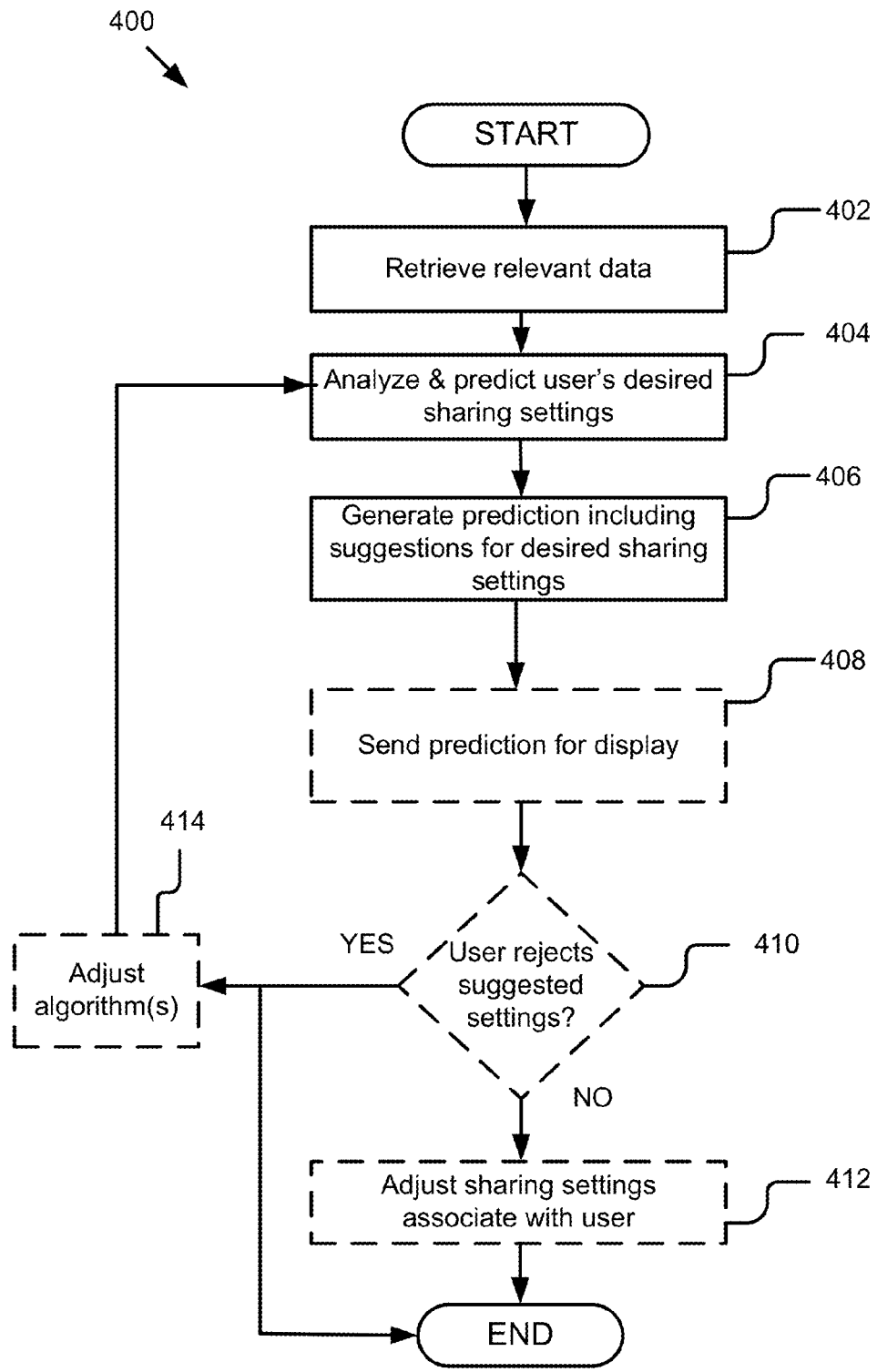
FIG. 4 is a flow chart illustrating a method for predicting one or more of a user's desired sharing settings based on an analysis of the user's relevant data according to one embodiment.

Referring now to FIG. 4, a flow chart illustrating an embodiment of a method 400 for predicting one or more of a user's desired sharing settings based on an analysis of the user's relevant data is shown.

The relevant data retrieval engine 302 of the sharing settings prediction module 220a obtains the relevant data 402. As discussed above, relevant data is data used to predict one or more of the user's desired sharing settings and includes, but is not limited to, data regarding the user's sharing settings for other sights and applications, the user's contacts' sharing settings, sharing setting of similar users, user's demographic information, user's online usage, user's characteristics, and data regarding which other users are accessing which of the user's features. The sharing settings prediction engine 304 receives the relevant data from the relevant data retrieval engine 302. The sharing settings prediction engine 304 analyzes the relevant data and predicts one or more of the user's desired sharing settings 404 based on the analysis of that relevant data.

Figure 5:
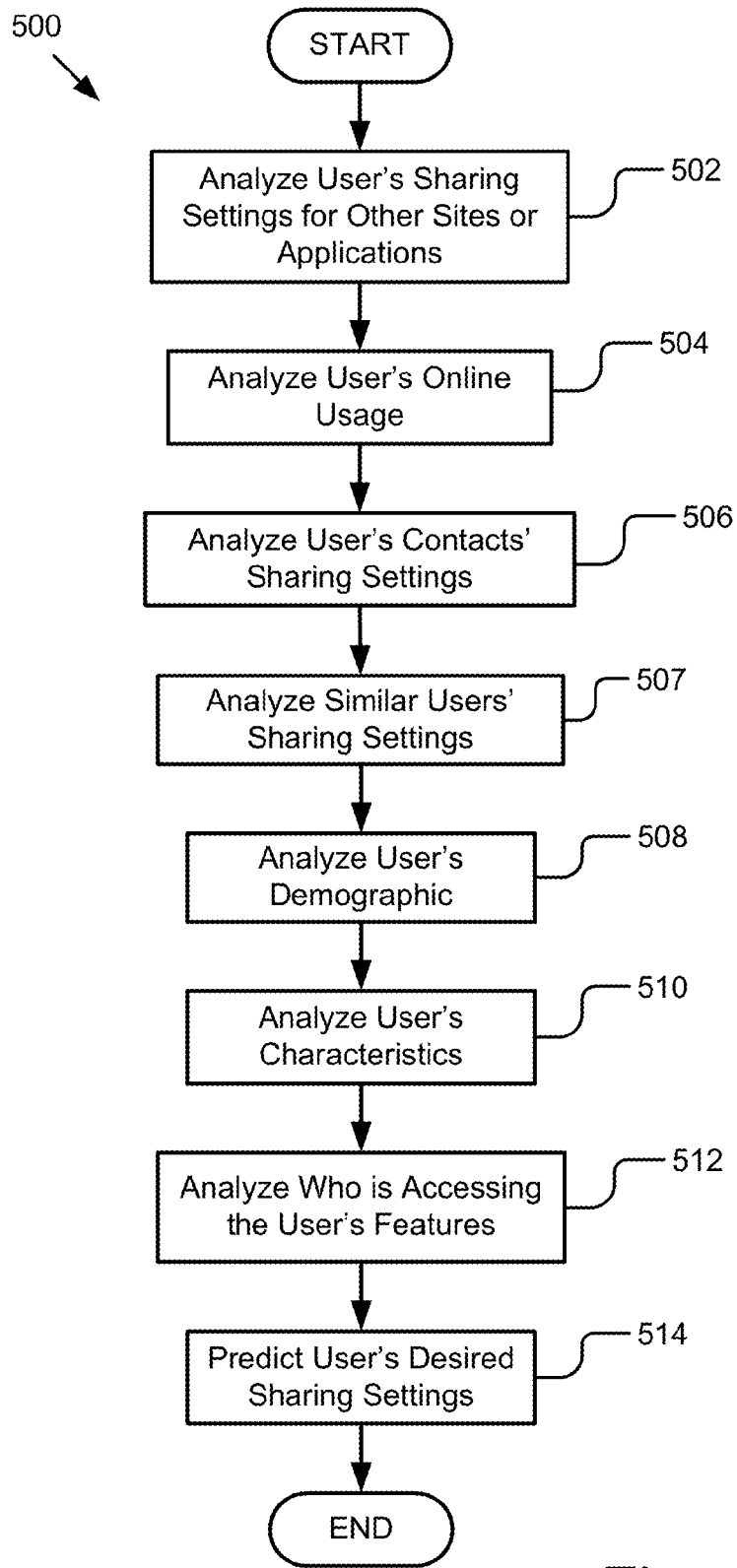
FIG. 5 is a flowchart illustrating a method for analyzing a user's relevant data and predicting a user's desired sharing settings according to one embodiment.

Referring now to FIG. 5, a flow chart illustrating a method 500 for analyzing the user's relevant data and predicting one or more of the user's desired sharing settings is shown in accordance with one embodiment. It will be clear to a person having ordinary skill in the art that this is just one embodiment. Other embodiments may use any of the analysis methods in FIG. 5 alone or in combination. Other embodiments may also include analysis methods in addition to or different from those of FIG. 5. The sharing settings prediction engine 304 analyzes the user's sharing settings for other sites and applications 502. In one embodiment, the sharing settings prediction engine 304 then analyzes the user's online usage 504.

Figure 6:
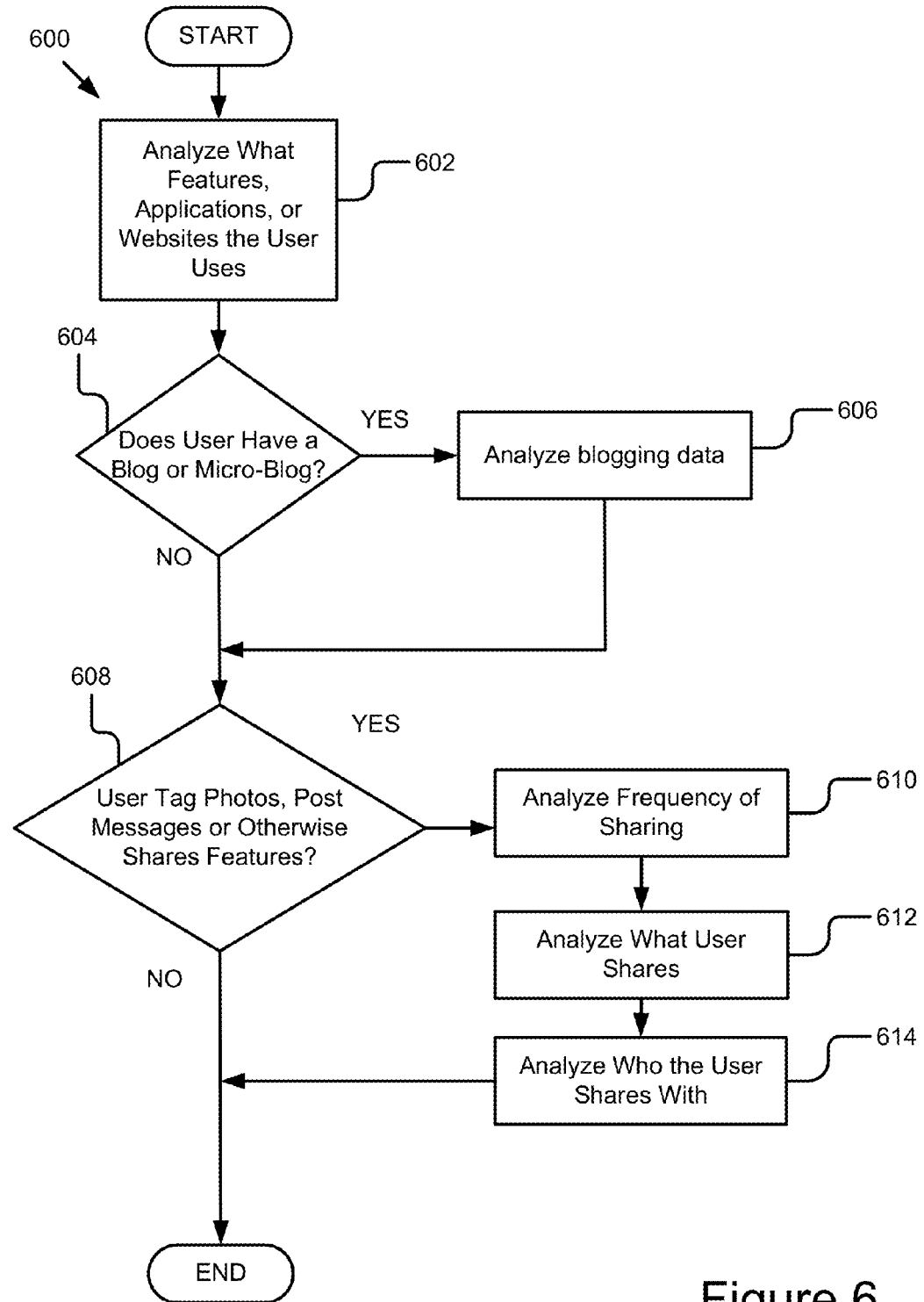
FIG. 6 is a flowchart illustrating a method for analyzing the user's online usage according to one embodiment.

Referring now to FIG. 6, a flow chart illustrating a method 600 for analyzing the user's online usage is shown in accordance with one embodiment. The sharing settings prediction engine 304 analyzes the features, applications, and websites the user uses 602 according to one embodiment. For example, if the user has a blog or micro-blog 604(Yes), the sharing settings prediction engine 304 analyzes the user's blogging data 606 including interactions with the blogging data (e.g., editing, commenting, reposting and sharing). In one embodiment, once the blogging data are analyzed 606, or if the user does not blog or micro-blog 604(No), the sharing settings prediction engine 304 analyzes whether the user shares features 608. If the user tags photos, posts messages, or otherwise shares features 608(Yes), the sharing settings prediction engine 304 analyzes how frequently the user shares features 610, what features the user is sharing 612, and who the user shares these features with 614 according to one embodiment.

Referring again to FIG. 5, in one embodiment, the sharing settings prediction engine 304 analyzes the sharing settings of the user's contacts 506. The sharing settings prediction engine 304 then analyzes sharing settings of similar users 507. In such embodiments, the sharing settings prediction engine 304 determines similarity of users based on information about the users, for example, information related to user demographics, sharing usage, and social network activity. The sharing settings prediction engine 304 then analyzes the user's demographic 508 according to one embodiment.

Figure 7:
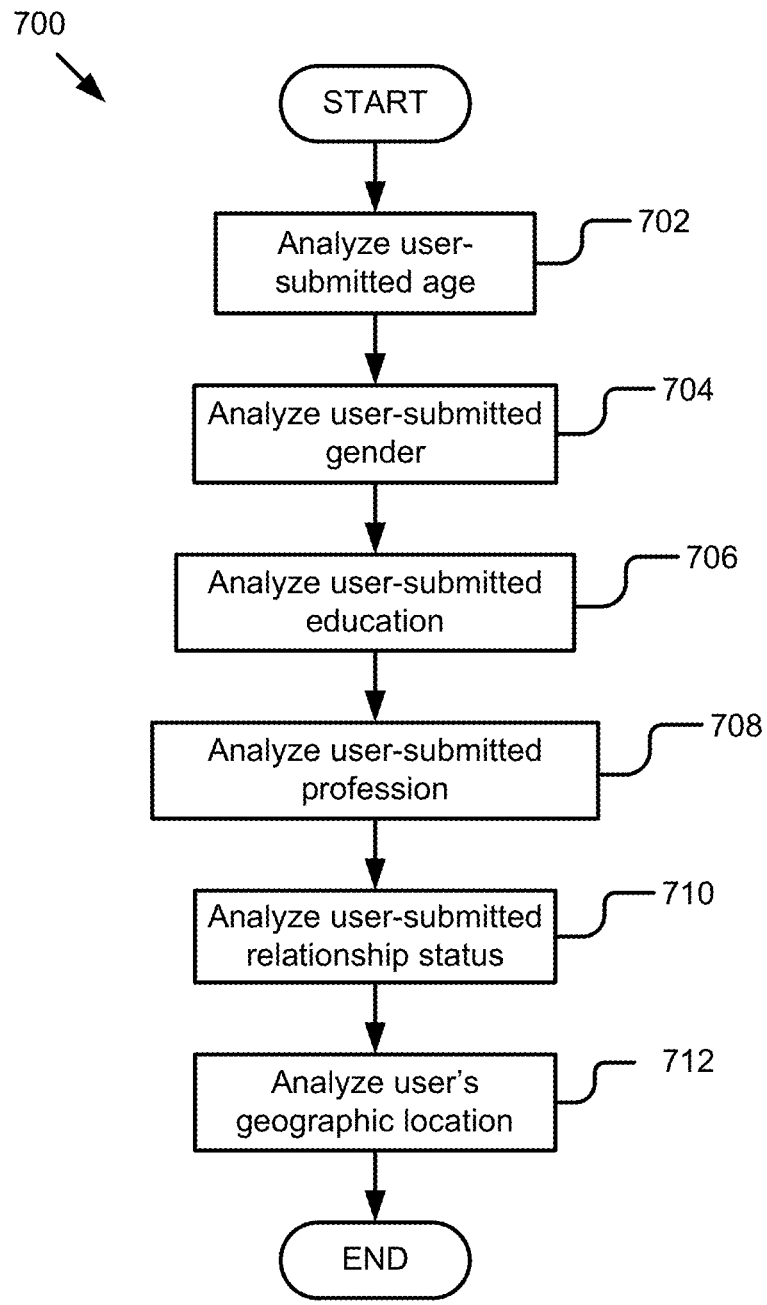
FIG. 7 is a flowchart illustrating a method for analyzing the user's demographic according to one embodiment.

Referring now to FIG. 7, a flow chart illustrating a method 700 for analyzing the user's demographic is shown in accordance with one embodiment. It will be clear to a person having ordinary skill in the art that this is just one embodiment. Other embodiments may use any of the analysis methods in FIG. 7 alone or in combination. Other embodiments may also include analysis methods in addition to or different from those of FIG. 7. According to one embodiment, the sharing settings prediction engine 304 analyzes the user's age 702, gender 704, education 706, profession 708, relationship status 710, and geographic location 712.

Referring again to FIG. 5, the sharing settings prediction engine 304, according to one embodiment, then analyzes the user's characteristics 510. As discussed above, the user's characteristics can be analyzed any number of ways, including, but not limited to, questionnaires, puzzles, or games or application and website usage. The sharing settings prediction engine 304 then analyzes what other users and applications are accessing the user's features and which features they are accessing 512 according to one embodiment. According to one embodiment, the sharing settings prediction engine 304 predicts one or more of the user's desired sharing settings 514 based on the foregoing analysis. As discussed above, in some embodiments, the sharing settings prediction engine 304 predicts the user's one or more desired sharing settings using one or more algorithms (not shown). In one embodiment, one or more algorithms rely on aggregate statistics. In one embodiment, one or more algorithms use statistical weighting. In one embodiment, the sharing settings prediction engine 304 predicts one or more of the user's desired sharing settings by selection. In another embodiment, the sharing settings prediction engine 304 predicts one or more of the user's desired sharing settings by elimination.

Referring again to FIG. 4, according to some embodiments, the method includes generating 406 a prediction including a suggestion for a desired sharing setting, and sending 408 the prediction for display to the user. The prediction notification engine 306 notifies the user of the sharing settings predicted 404 by the sharing settings prediction engine 304. As mentioned above, the prediction can be displayed in any number of places including, but not limited to, an e-mail, a pop-up, a separate webpage, or where the sharing settings are typically set or displayed. The prediction can include various amount of detail including, but not limited to, whether any of the user's sharing settings differ from those predicted 404, one or more of the user's current settings, one or more of the user's predicted 404 sharing settings, how the user can accept or adjust the sharing settings, if the sharing settings have already been adjusted, and on what basis one or more predictions 404 were made. In one embodiment the predicted 404 sharing settings are the suggested sharing settings in the generated 406 prediction. In one embodiment, the user's sharing settings are automatically adjusted (not shown) based on the generated 406 prediction rather than sending 408 the prediction for display. According to one embodiment, the user is given the option to accept or reject one or more of the suggested desired sharing settings 410.

According to some embodiments, if one or more of the predicted sharing settings is rejected 410 (Yes), one or more of the algorithms used by the sharing settings prediction engine 304 are adjusted 414 based on the user's feedback. As discussed above, the user's feedback can include the rejection of the predicted sharing setting alone, or can include additional information, such as the user's response to questions regarding the user's preference for a non-predicted sharing setting. In some embodiments, the statistical weighting factors in the algorithms are adjusted based on the feedback. In some embodiments, the aggregate statistics used by the algorithm are adjusted based on the feedback. In some embodiments, after adjusting 414 one or more of the algorithms the user's relevant data is analyzed and the users desired sharing settings are predicted 404 again using the adjusted algorithms. In one embodiment, the cycle of analyzing user's relevant data and predicting the user's desired sharing settings 404, generating a prediction 406, sending the prediction for display 408, and adjusting 414 the algorithms is repeated until the user accepts one or more of the predicted sharing settings 410 (No).

According to some embodiments, the method includes adjusting one or more of the user's sharing settings 412 to one or more of the predicted sharing settings. The settings adjuster engine 308 adjusts one or more of the user's sharing settings 410 to one or more of the sharing settings predicted 404 by the sharing settings prediction engine 304 and suggested in the generated 406 prediction. As mentioned above, in one embodiment, the settings adjuster engine 310 automatically adjusts the user's sharing settings 412 to those predicted by the sharing settings prediction engine 304 without user action or permission. In some such embodiments, the sharing settings are only adjusted 412 if the predicted sharing settings are more stringent than the user's current sharing settings. In one embodiment, the user must accept 410(No) one or more of the predicted sharing settings and only the predicted sharing settings accepted 410(No) by the user are adjusted 412.

Graphical User Interface

Figure 9:
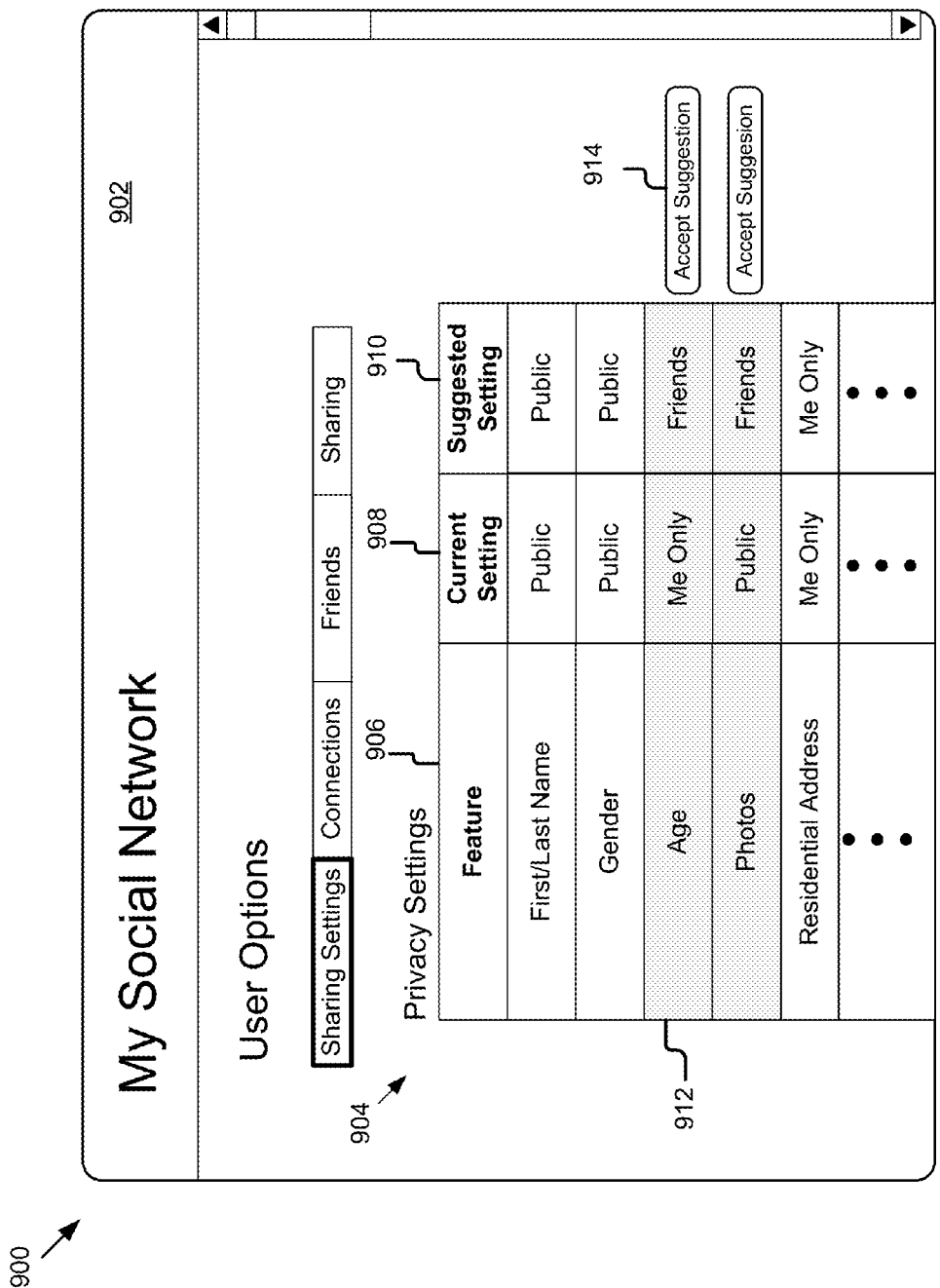
FIG. 9 is a graphic representation of an example of a user interface displaying the user's sharing settings and the predicted sharing settings according to one embodiment.

FIG. 9 is a graphic representation of an example of a user interface 900 displaying a user's social networking page 902. In one embodiment, the user's sharing settings 904 are normally displayed under the sharing settings tab of user options. In one embodiment, the sharing settings 904 include a table displaying the features 906, the user's current sharing setting associated with each feature 908, and the predicted sharing settings 910 for each feature. According to one embodiment, the user is notified when a user's sharing setting differs from the predicted sharing settings. In one embodiment, this notification is visual. For example, highlighting 912 one or more features 906 whose current setting 908 differs from the predicted setting 910. In one embodiment, the user must choose to accept the predicted sharing preference 910 before the user's current setting 908 is adjusted to match. In one embodiment, the predicted sharing settings can be accepted or rejected for each feature individually. In one embodiment, acceptance or rejection of the predicted sharing settings is done in the same location as the notification of the predicted sharing settings 904. In one embodiment, the acceptance is done by clicking on a button 914. Acceptance of the predicted sharing setting automatically adjusts the user's current sharing setting 908 to the predicted sharing setting 910 according to one embodiment.

The foregoing description of the embodiments has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims of this application. As will be understood by those familiar with the art, the embodiments may take other specific forms without departing from the spirit or essential characteristics thereof. Likewise, the particular naming and division of the modules, routines, features, attributes, methodologies and other aspects are not mandatory or significant, and the mechanisms that implement one embodiment or its features may have different names, divisions and/or formats. Furthermore, as will be apparent to one of ordinary skill in the relevant art, the modules, routines, features, attributes, methodologies and other aspects of the embodiments can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the embodiments are in no way limited to implementation in any specific programming language, or for any specific operating system or environment. Accordingly, the disclosure of the present invention is intended to be illustrative, but not limiting, of the scope, which is set forth in the following claims.

What is claimed is:

1. A computer-implemented method for predicting one or more sharing settings for a user, the method comprising:
   receiving unrated, relevant user data, wherein the unrated, relevant user data includes data associated with a user of a social network system and data regarding sharing settings of other users;
   analyzing the unrated, relevant user data to determine a preferred level of sharing of the user based on the analysis of the unrated, relevant user data;
   generating one or more predictions, wherein the prediction includes a suggestion of a desired sharing setting that controls which other users of the social network system are able to access what portion of the user's information within the social network system, the suggestion of the desired sharing setting based on the analyzed unrated, relevant user data and the determined preferred level of sharing; and
   sending the one or more predictions for display.

2. The method of claim 1, wherein the unrated, relevant user data comprises the user's sharing settings for one or more other sites or other applications.

3. The method of claim 1, wherein the unrated, relevant user data comprises information regarding the user's online usage.

4. The method of claim 1, wherein the data regarding sharing settings of other users comprises the sharing settings of one or more similar users.

5. The method of claim 1, wherein the unrated, relevant user data comprises the user's demographic information.

6. The method of claim 1, wherein the unrated, relevant user data comprises information regarding the user's characteristics.

7. The method of claim 1, wherein the unrated, relevant user data comprises information regarding what other users and applications access which of the user's features.

8. The method of claim 1, wherein the analysis, the predicting sharing settings, or both use statistical weighting.

9. The method of claim 1, the method further comprising:
comparing one or more predictions to the user's current sharing settings.

10. The method of claim 9, the method further comprising:
notifying the user of the results of the comparison between the one or more predictions and the user's current sharing settings.

11. The method of claim 1, the method further comprising:
adjusting one or more of the user's sharing settings according to the one or more predictions.

12. The method of claim 10, the method further comprising:
receiving feedback from the user wherein the user accepts or rejects one or more of the predictions.

13. The method of claim 12, wherein the feedback adjusts one or more of the algorithms used for analyzing the user's unrated, relevant data, predicting sharing settings, or both.

14. A computer-implemented method for predicting one or more sharing settings for a user, the method comprising:
receiving unrated, relevant user data, wherein the unrated, relevant user data includes data associated with a user of a social network system and data regarding sharing settings of other users;
analyzing the unrated, relevant user data to determine a preferred level of sharing of the user based on the analysis of the unrated, relevant user data;
predicting one or more predictions of desired sharing settings of the user that control which other users of the social network system are able to access what portion of the user's information within the social network system, the one or more predictions of desired sharing settings of the user based on the analyzed unrated, relevant user data and determined preferred level of sharing; and
automatically adjusting the user's sharing settings according to the one or more predictions.

15. A system for predicting one or more sharing settings for a user, the system comprising:
a processor, and at least one module, stored in the memory and executed by the processor, the at least one module including instructions for:
receiving unrated, relevant user data, wherein the unrated, relevant user data includes data associated with a user of a social network system and data regarding sharing settings of other users;
analyzing the unrated, relevant user data to determine a preferred level of sharing of the user based on the analysis of the unrated, relevant user data;
generating one or more predictions, wherein the prediction includes a suggestion of a desired sharing setting that controls which other users of the social network system are able to access what portion of the user's information within the social network system, the suggestion of the desired sharing setting based on the analyzed unrated, relevant user data and the determined preferred level of sharing; and
sending the one or more predictions for display.

16. The system of claim 15, wherein the unrated, relevant user data comprises the user's sharing settings for one or more other sites or other applications.

17. The system of claim 15, wherein the unrated, relevant user data comprises information regarding the user's online usage.

18. The system of claim 15, wherein the data regarding sharing settings of other users comprises the sharing settings of one or more similar users.

19. The system of claim 15, wherein the unrated, relevant user data comprises the user's demographic information.

20. The system of claim 15, wherein the unrated, relevant user data comprises information regarding the user's characteristics.

21. The system of claim 15, wherein the unrated, relevant user data comprises information regarding what other users and applications access which of the user's features.

22. The system of claim 15, wherein the analysis, the predicting sharing settings, or both use statistical weighting.

23. The system of claim 15, the method further comprising:
comparing one or more of the predictions to the user's current sharing settings.

24. The system of claim 23, the method further comprising:
notifying the user of the results of the comparison between the one or more predictions and the user's current sharing settings.

25. The system of claim 15, the method further comprising:
adjusting one or more of the user's sharing settings according to the one or more predictions.

26. The system of claim 23, the method further comprising:
receiving feedback from the user wherein the user accepts or rejects one or more of the predictions.

27. The system of claim 26, wherein a user's feedback adjusts one or more of the algorithms used for analyzing the user's unrated, relevant data, predicting sharing settings, or both.

28. A system for predicting one or more sharing settings for a user, the system comprising:
a processor, and at least one module, stored in the memory and executed by the processor, the at least one module including instructions for:
receiving unrated, relevant user data, wherein the unrated, relevant user data includes data associated with a user of a social network system and data regarding sharing settings of other users;
analyzing the unrated, relevant user data to determine a preferred level of sharing of the user based on the analysis of the unrated, relevant user data;
generating one or more predictions, wherein the prediction includes a suggestion of a desired sharing setting that controls which other users of the social network system are able to access what portion of the user's information within the social network system, the suggestion of the desired sharing setting based on the analyzed unrated, relevant user data and the determined preferred level of sharing; and
automatically adjusting the user's sharing settings according to the one or more predictions.

29. A computer program product comprising a non-transitory computer usable storage medium including a computer readable program, the computer readable program when executed by a processor causes the processor to:
receive unrated, relevant user data, wherein the unrated, relevant user data includes data associated with a user of a social network system and data regarding sharing settings of other users;

analyze the unrated, relevant user data to determine a preferred level of sharing of the user based on the analysis of the unrated, relevant user data;

generate one or more predictions, wherein the prediction includes a suggestion of a desired sharing setting based on the analyzed unrated, relevant user data and the determined preferred level of sharing; and generate a sharing suggestion display including the one or more predictions, wherein the one or more predictions includes a suggestion of at least one desired sharing setting that controls which other users of the social network system are able to access what portion of the user's information within the social network system.

30. The computer program product of claim 29, further comprising:

generating at least one current setting for the sharing setting associated with the suggestion of at least one desired sharing setting.

31. A computer program product comprising a non-transitory computer usable storage medium including a computer readable program, the computer readable program when executed by a processor causes the processor to:

receive unrated, relevant user data, wherein the unrated, relevant user data includes on-line activity of the user of a social network system, descriptive information about the user and data regarding sharing settings of other users;

analyze the unrated, relevant user data to determine a preferred level of sharing of the user based on the analysis of the on-line activity of the user and the descriptive information about the user;

generate one or more predictions, wherein the prediction includes a suggestion of a desired sharing setting that controls which other users of the social network system are able to access what portion of the user's information within the social network system, the suggestion of the desired sharing setting based on the analyzed unrated, relevant user data and the determined preferred level of sharing; and send the one or more predictions for display.

* * * * *